United States Patent
Ferguson et al.

(10) Patent No.: US 6,266,402 B1
(45) Date of Patent: Jul. 24, 2001

(54) APPARATUS AND METHOD FOR DETECTING FOCUSED OVERLOAD

(75) Inventors: Thomas L. Ferguson, Carrollton; Kurt D. Wagner, Dallas; Maureen R. O'Toole, Plano; Mohammed Z. Ali, Dallas, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/067,542

(22) Filed: Apr. 27, 1998

(51) Int. Cl.[7] .................................................. H04M 15/00
(52) U.S. Cl. ........................... 379/134; 379/229; 379/207
(58) Field of Search ..................................... 379/207, 219, 379/220, 221, 229, 230, 242, 133, 115, 134

(56) References Cited

U.S. PATENT DOCUMENTS 5,778,057 * 7/1998 Atai .................................. 379/111 X
5,825,860 * 10/1998 Moharram ........................ 379/115 X

* cited by examiner

Primary Examiner—Creighton Smith
(74) Attorney, Agent, or Firm—Baker Botts L.L.P.

(57) ABSTRACT

The invention comprises an apparatus for detecting focused overload in a telecommunications network. The apparatus comprises a plurality of originating switching points each coupled to a plurality of originating devices. The apparatus further comprises a destination switching point coupled to a destination device. The apparatus further comprises a transfer point coupled to the plurality of originating switching points and the destination switching point, each of the plurality of originating devices initiating communication through one of the plurality of originating switching points to the destination device utilizing the transfer point, the transfer point detecting focused overload at the destination switching point by detecting a predetermined threshold of initiated communications traffic communicated from the plurality of originating devices to the destination device.

21 Claims, 3 Drawing Sheets

FIG. 1

APPARATUS AND METHOD FOR DETECTING FOCUSED OVERLOAD

TECHNICAL FIELD OF THE INVENTION

The present invention relates to the field of telecommunications and more particularly to an apparatus and method for detecting focused overload.

BACKGROUND OF THE INVENTION

Both public and private communications switching networks are arranged as groups of interconnected switching points. A local service provider maintains a network of interconnected switching points to provide service to its customers. The switching points are coupled at transfer points and each switching point serves a number of connected devices, such as telephones, terminals, and computers. To establish communications between two devices, an originating device dials a number identifying a destination device. The interconnected switching points route the call to the called party in accordance with the dialed number.

Under certain conditions, namely when a destination device is flooded by communications traffic from an exceedingly large number of originating devices, the switching point connected to that destination device can experience an overloaded condition. Such an overloaded condition may be referred to as focused overload. Excessive traffic to a specific destination device can have an adverse effect on the performance of a local service provider's telecommunications network. In particular, excessive traffic may cause network congestion, the failure of resident applications at switching points, or complete element failure at the switching point closest to the destination device. Other network devices and/or connections may be similarly overloaded or have their performance interrupted during excessive communications traffic to a single destination device.

Examples of events resulting in excessive communications traffic to a single device include, for example, calls placed to a specific number during radio contests, calls placed to government, administration, or public service organizations during natural disasters, and other unannounced or unpredicted large call volume events. Call control systems such as Automatic Code Gapping are currently available to handle excessive amounts of communications traffic to a single number if the occurrence of such large call volume events are either planned, predicted, or detected. Problems arise, however, when a large call volume event to a single destination device occurs without proper planning or adequate determination.

SUMMARY OF THE INVENTION

In accordance with the present invention, the problems and consequences caused by the inability of prior apparatus and methods inability to adequately and rapidly detect excessive communications traffic to a single destination device have been substantially reduced or eliminated.

In accordance with one embodiment of the present invention, an apparatus for detecting focused overload in a telecommunications network is disclosed that comprises a plurality of originating switching points each coupled to a plurality of originating devices. The apparatus further comprises a destination switching point coupled to a destination device. The apparatus further comprises a transfer point coupled to the plurality of originating switching points and the destination switching point, each of the plurality of originating devices initiating communication through one of the plurality of originating switching points to the destination device utilizing the transfer point, the transfer point detecting focused overload at the destination switching point by detecting a predetermined threshold of initiated communications traffic communicated from the plurality of originating devices to the destination device.

Technical advantages of the present invention include detecting excessive communications traffic directed at a single destination device. Additionally, the present invention provides an early indicator to a telecommunications network that overload conditions may exist. The apparatus and method of the present invention also allows the detection of excessive communications traffic to a device without the necessity for large amounts of processing or memory. A further advantage of the present invention includes utilizing detected excessive communications traffic to reduce or prevent the occurrence of overloaded conditions. Other advantages are readily apparent to one of ordinary skill in the art in light of the following figures, description, and claims.

BRIEF DESCRIPTION OF THE DRAWINGS

For a more complete understanding of the present invention and its advantages thereof, reference is now made to the following brief description, taken in conjunction with the accompanying drawings and detailed description, wherein like reference numerals represent like parts, in which.

DETAILED DESCRIPTION OF THE INVENTION

Figure 1:
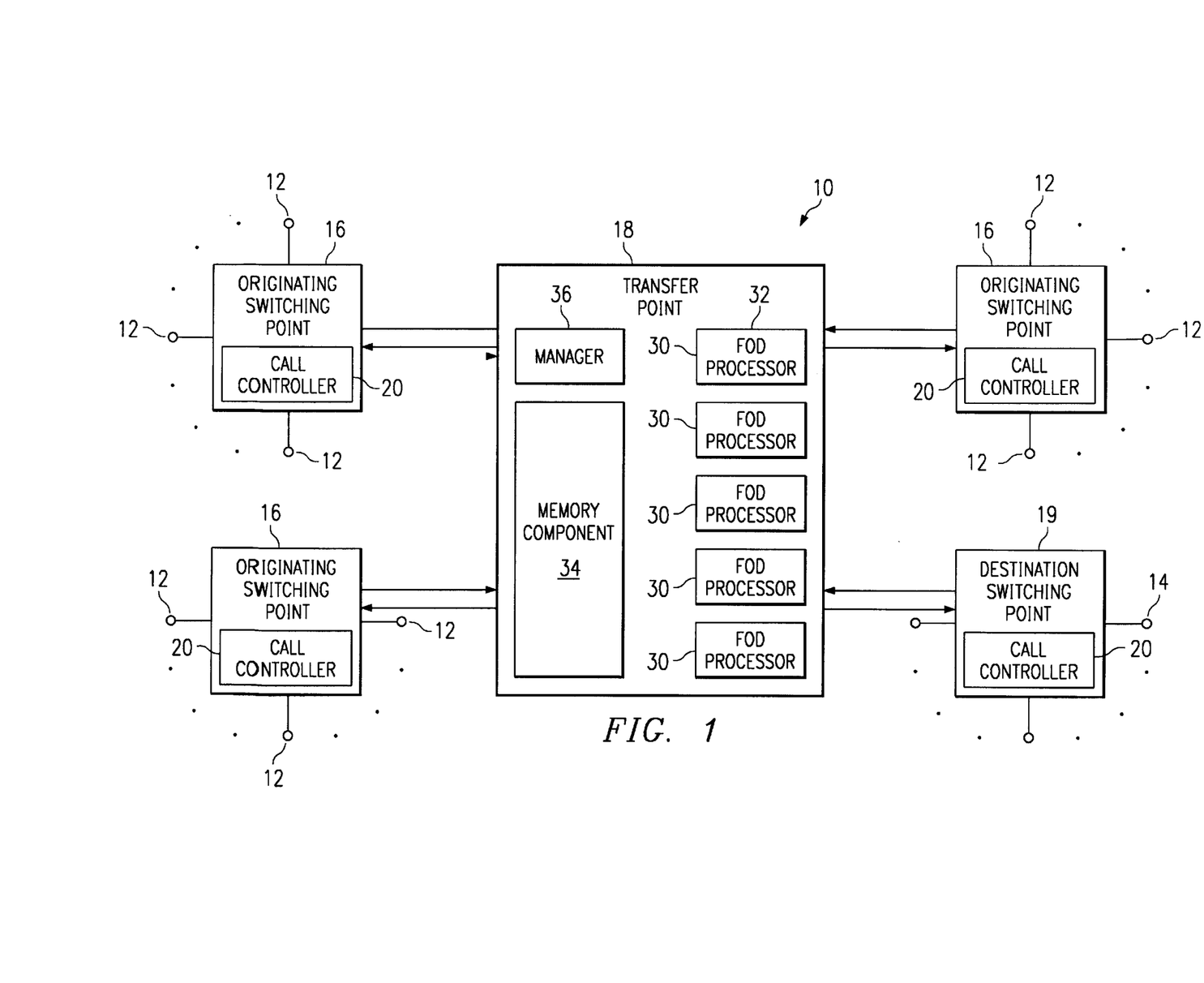
FIG. 1 illustrates a system for detecting focused overload in a telecommunications network according to the teachings of the present invention.
Figure 2A:
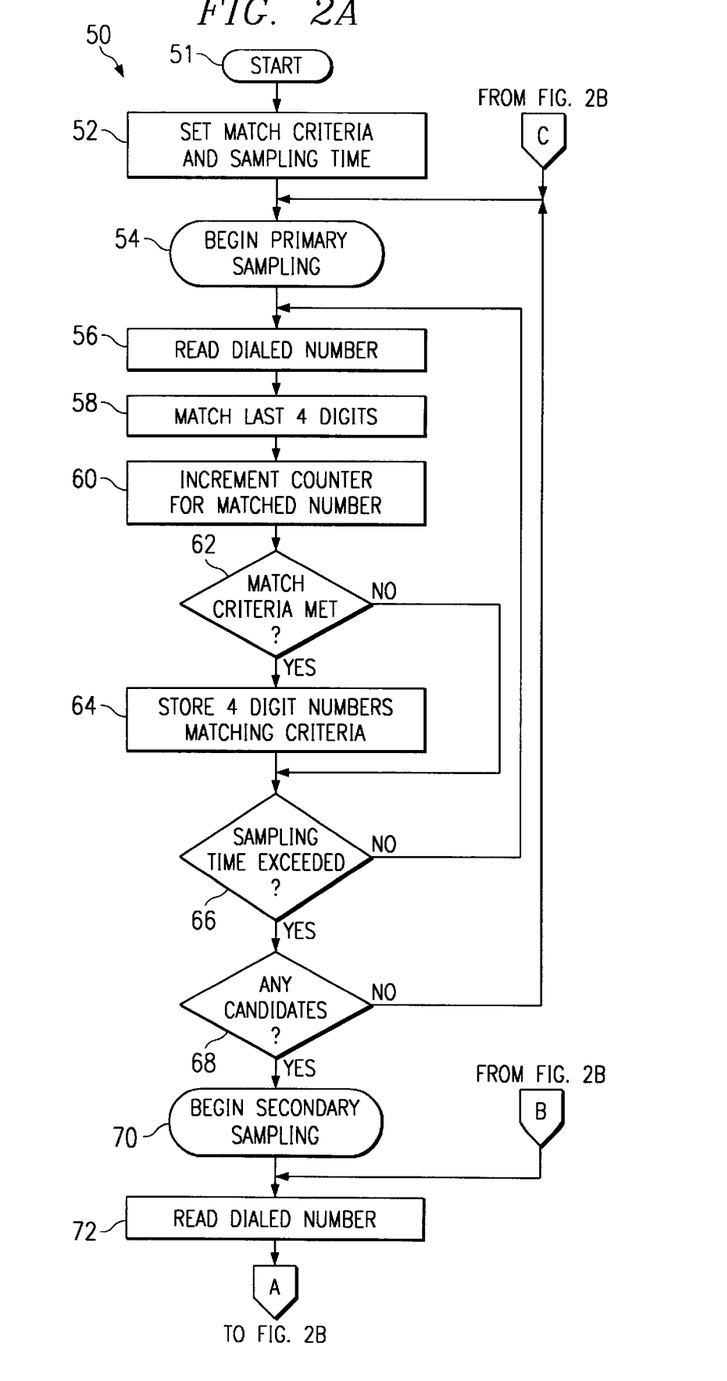
FIGS. 2A and 2B illustrate the flow of a method for detecting focused overload in a telecommunications network according to the teachings of the present invention.
Figure 2B:
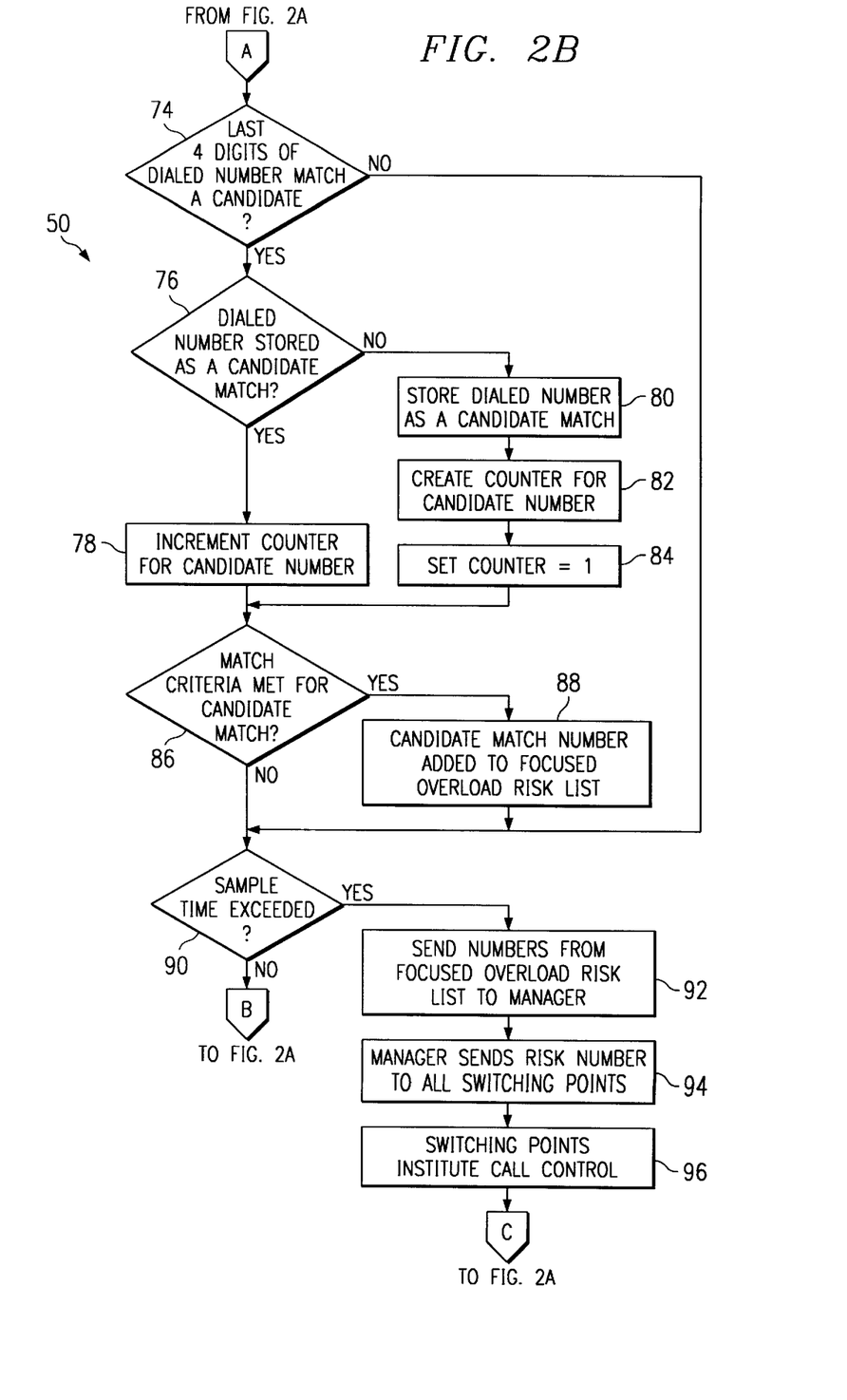

The embodiments of the present invention and its advantages are best understood by referring now in more detail to FIGS. 1–2B of the drawings, in which like numerals refer to like parts.

FIG. 1 illustrates a system 10 for detecting focused overload in a telecommunications network caused by excessive communications traffic from a plurality of originating devices 12 to a destination device 14. Focused overload is an overloaded condition experienced at a switching point when a device attached to that switching point is flooded with excessive communications traffic, as described in further detail above in the Background of the Invention. Generally, system 10 detects excessive communications traffic to a single destination device 14 so that a communications network associated with system 10 can prevent focused overload at a particular destination switching point 19. Portions of system 10 for detecting focused overload are described in greater detail below with further reference to FIG. 1, and the process of detecting focused overload by system 10 is described in greater detail in conjunction with FIGS. 2A and 2B.

Originating devices 12 initiate communication to destination device 14 by dialing, for example, a ten digit number associated with destination device 14. The dialed number will be identified throughout this description as a ten digit number; however, it should be understood that the system and method of the present invention may be utilized with dialed numbers having any number of digits. Similarly, other references to numbers or subsets of numbers containing a specific number of digits do not restrict the scope of this invention to the specific numbers of digits described herein.

Each originating device 12 is connected to an originating switching point 16 that receives a dialed ten-digit number from device 12 and relays a query conveying that ten-digit number to a transfer point 18. Transfer point 18 samples a representative quantity of all queries received to determine if the potential for focused overload exists at a destination switching point 19 and informs originating switching points 16 of the possibility of such overload at destination switching point 19 due to excessive communications traffic directed at a particular destination device 14.

Originating switching point 16 and destination switching point 19 may include any suitable combination of discreet logic, processing components, memory, or software, or may be integrated into a portion of or a complete computing device or application specific integrated circuit (ASIC). Originating switching point 16 and destination switching point 19 communicate with transfer point 18 utilizing signaling system architecture such as Signaling System 7 (SS-7) links, or any other suitable signaling architecture. The signaling system architecture allows components of system 10 to communicate messages for routing calls from originating switching points 16 to destination switching point 19.

Originating switching point 16 and destination switching point 19 also each include a call controller 20. Call controller 20 may comprise any suitable combination of hardware or software that has the capacity for processing and controlling calls initiated by originating devices 16.

Call controller 20 actively controls the time interval at which queries are sent by originating switching point 16 to transfer point 18 for call initiation. In particular, call controller 20 of each originating switching point 16 responds manually or automatically to call control messages communicated by transfer point 18. The call control messages direct each call controller 20 to decrease the rate at which queries associated with a particular ten-digit number are sent to transfer point 18. By decreasing the rate of such associated queries, the communications traffic directed at a particular destination device 14 can be reduced and focused overload at destination switching point 19 can be prevented or corrected.

In one embodiment, call controller 20 utilizes Automatic Code Gapping (ACG) to regulate the time interval at which query messages that identify a common destination device 14 are sent to transfer point 18. In one embodiment, each call controller 20 responds to calls placed by originating devices 12 to destination device 14 associated with potential focused overload. Call controller then indicates to originating devices 12 that the ten-digit number associated with the particular destination device 14 is temporarily unavailable for communication. Such communication may include prerecorded voice messaging, text communication, or other appropriate signaling.

Transfer point 18 directs the flow of communications within a communications network. Transfer point 18 includes a plurality of processors 30, a memory component 34, and a manager 36. Transfer point 18 responds to queries, from an originating switching point 16, that contain a ten-digit dialed number with a query response containing data needed to complete the routing of a call. More specifically, transfer point 18 receives queries from originating switching points 16 and responds to such queries by issuing a query response containing call routing information such as, for example, data indicating where a destination device 14 associated with a dialed telephone number is actually located within the communications network. Such information enables local number portability between local service providers. Such local number portability allows local telephone customers to switch their service providers while retaining the same telephone number.

Transfer point 18 also incorporates a call control message into query responses to originating switching points 16. The call control message is utilized by call controller 20 of each switching point 16 to regulate the rate at which queries are sent from originating switching points 16 to transfer point 18. In one embodiment, the call control message comprises three parameters. These three parameters include a ten-digit number associated with potential focused overload at destination switching point 19, a time interval at which queries associated with the ten-digit number should be sent to transfer point 18 in order to prevent the focused overload, and a duration for which call controller 20 should regulate the time interval at which queries are sent to transfer point 18.

Transfer point 18, as previously indicated, includes a plurality of processors 30, such as Distributed SS7 Services (DSS) processors. Queries from originating switching points 16 are routed by manager 36 resident within transfer point 18 in a round robin fashion among the plurality of processors 30. In other words, manager 36 distributes incoming queries by sequentially alternating assignments of such queries to processors 30 as transfer point 18 receives queries from originating switching points 16. Thus, each processor 30 receives a representative sample of the overall communication traffic in the form of queries from originating switching points 16.

A single processor 30 is selected from the plurality of processors 30 as a Focused Overload Determination (FOD) processor 32. FOD processor 32 detects focused overload at destination switching point 19 caused by heavy call volume directed at a ten-digit number associated with destination device 14. FOD processor 32 receives a representative sample of queries from originating switching points 16 to transfer point 18 as described above. Working within this representative sample of queries, FOD processor 32 samples the ten-digit numbers associated with each query to determine and detect focused overload at destination switching point 19 associated with destination device 14.

Manager 36 is a coordinating processor or application resident within a computing platform that coordinates focused overload detection within transfer point 18 as described above. In one embodiment, manager 36 is a Common Channel Manager (CCM) utilized to manage and route signals at transfer points on communications networks utilizing an SS7 link. Manager 36 assigns one of the plurality of processors 30 to be FOD processor 32 as previously described. Manager 36 also provides FOD processor 32 with a specified sampling time and match criteria by which FOD processor 32 can determine if queries associated with a particular ten-digit number are being received by transfer point 18 at a rate likely to cause focused overload at destination switching point 19. The sampling time and match criteria may be set by a local provider of communications services.

In one embodiment, manager 36 references a table specifying values of exact sampling times and match criteria to be utilized to detect focused overload. For example, such a table could specify such values based upon data such as the threshold of queries received by transfer point 18 that corresponds to focused overload, hereinafter referred to as FOD threshold, the number of processors 30 utilized by transfer point 18, or the probability that a random match will be made in the absence of focused overload conditions. In particular the match criteria is dependent on the number of processors 30 within system 10, the sampling time, and the FOD threshold. As FOD processor 32 only examines a representative sample of the total queries received by transfer point 18, the FOD threshold will be reduced by a factor dependent on the number of samples, or processors 30, utilized by transfer point 18, to arrive at the match criteria for that sample. The match criteria to be set at a particular transfer point 18 can be determined using the following relationship:

$$\text{match criteria} = \frac{(FOD \text{ threshold} \times \text{sampling time})}{\text{number of processors } 30}$$

Sampling time can be similarly determined as follows:

$$\text{sampling time} = \frac{(\text{match criteria} \times \text{number of processors } 30)}{FOD \text{ threshold}}$$

Manager 36 responds to indications of focused overload conditions from processor 32 by asserting a call control message to all processors 30 for delivery to originating switching points 16. The call control message is then relayed by processors 30 in query responses to originating switching points 16 as described above to be utilized by call controller 20 for regulating query placement. Call control messages can trigger the response of call controller 20, and subsequent regulation of queries by call controller 20, automatically or after manual adjustment. One embodiment of a call control message and its parameters is described above as part of the description of call controller 20.

Referring now to FIG. 2A, a portion of a flowchart 50 is shown illustrating exemplary steps associated with the detection of focused overload at a particular destination switching point 19 due to an excessive amount of communications traffic directed at a single destination device 14 associated with a specific phone number such as a ten-digit number.

Detection of focused overload begins at step 51. Manager 36 first selects one of the plurality of processors 30 to be FOD processor 32 by sending non-zero values for a match criteria and a sampling time in step 52. The non-zero values for the match criteria and sampling time sent by manager 36 are provided to FOD processor 32 in a focused overload command message. The match criteria specifies a number of queries directed to a specific destination device 14 that, if received as part of the representative sample of queries reviewed by FOD processor 32 within an interval of time specified by the sampling time, signify a potential for focused overload. All other processors 30 receive zero values for the match criteria and sampling time, directing other processors 30 not to perform any focused overload detection.

Once FOD processor 32 has received match criteria and a sampling time from manager 36, FOD processor 32 begins a primary sampling routine in step 54. The purpose of the primary sampling routine is to make an initial pass through a representative sample of queries received at transfer point 18, and more particularly, through the dialed ten digit numbers associated with the queries, to identify a frequently recurring subset of dialed numbers associated with the queries that may reflect focused overload at a specific destination switching point 19. Although the primary sampling routine does not actually keep track of individual ten digit numbers received, the routine does keep track of the frequency at which those individual ten digit numbers include common digit values. For example, in one embodiment of the disclosed invention the primary sampling routine counts the number of ten digit dialed numbers that commonly contain an identical sequential last four digits. Thus, the primary sampling routine can conclude how frequently various combinations of four digit numbers appear as the last four digits of individual ten digit numbers received by transfer point 18 as the target of queries initiated from switching points 16.

As previously discussed, FOD processor 32 receives a representative sample of queries associated with all communications traffic managed by transfer point 18. FOD processor 32 utilizes memory component 34 of transfer point 18 in order to store a memory array of counters associated with four digit numbers. The memory array includes one cell, entry, register, or other subset of memory devoted to each of the consecutive four-digit numerals from 0000 to 9999. Thus, the memory array includes ten thousand separate memory locations for counters associated with every combination of a four-digit number.

FOD processor 32 reads a dialed ten-digit number, or other number of variable digit length, received in a query from one of the plurality of originating switching points 16 in step 56. FOD processor 32 then matches the last four-digits of the dialed ten-digit number with the four-digit numbers associated with each of the ten thousand locations of the memory array in step 58. Alternatively, FOD processor 32 may match a lesser or greater amount of digits with the understanding that the size of the memory array will change accordingly. Along the same lines, a different subset of digits could be selected for matching purposes, such as the middle four digits or the 3 most significant digits.

One advantage of the present invention includes limiting the time and resources involved in focused overload detection. As such, detecting a large amount of dialed ten digit numbers having the same last four digits of a number should be an unusual occurrence in a local communications network. Detecting a large amount of dialed ten digit numbers with the same three or four most significant digits, on the other hand, would do little do reduce the expenditure of time and resources. This is because in most communications networks such digits correspond to an area code or other indicator frequently appearing within one local communications network. In some cases, however, particularly if one were attempting to limit the focused overload of communications traffic directed at a specific internet service provider for example, matching the first three digits, corresponding to the internet service providers domain location, may be both efficient and timely.

As previously noted, each of the ten thousand memory locations in the memory array stores a counter associated with its particular four-digit number. Prior to the beginning of primary sampling in step 54, each of these counters is initialized with a zero value. If the last four-digits of the dialed ten-digit number are the same as the four-digit numeral associated with a particular memory location, the counter resident within that memory location is incremented by one in step 60. Therefore, the value of each counter is indicative of the number of calls destined for a particular destination device 14.

FOD processor 32 then determines if the match criteria set by manager 36 has been met for the matched four-digit number in step 62. More particularly, FOD processor 32 compares the value specified in the match criteria to the value of the counter associated with the four-digit number that is stored in the memory array. For example, if during a five second sampling time a match criteria of four matches is set for the representative sample of queries processed by FOD processor 32, and if the matched four-digit number corresponds to a counter value of four or greater, then queries to numbers containing those four-digits have met the match criteria as determined in step 62. If the match criteria are so met then a sufficient number of calls destined for a single destination point 14 exist to create a potential for a focused overload condition. If the four-digit number does meet the match criteria, the four-digit number is then stored in step 64. The stored four-digit number is used as a candidate for possible focused overload conditions in a candidate list. The candidate list is utilized for further analysis that is conducted during the secondary sampling described below in step 70.

Regardless of whether or not the last four-digits of the ten-digit dialed number have created a candidate for possible focused overload conditions, FOD processor 32 next determines if the sampling time set by manager 36 has been exceeded in step 66. This determination is made through the use of a clock signal, an interrupt, software, or other indication of time. If the sampling time has not been exceeded, FOD processor 32 returns to step 56 and reads the next ten-digit dialed number, repeating the process of matching, counter incrementation, and match condition testing for that read number.

If the sampling time was exceeded in step 66, FOD processor 32 next determines in step 68 if the match criteria was met for any of the ten thousand four-digit numbers. If the match criteria was met for any of the four-digit numbers and candidates for potential focused overload exist, FOD processor begins the secondary sampling routine in step 70. If the match criteria was not met for any four-digit number and no candidates exist, FOD processor 32 returns to step 54 to restart the primary sampling routine.

In another alternative embodiment, the primary sampling routine may terminate prior to the completion of the sampling time set by manager 36 if a predetermined number of four-digit numbers have met the match criteria. In such an embodiment, when a predetermined number of candidates for potential focused overload are detected, FOD processor 32 begins the secondary sampling of step 70.

After the primary sampling procedure has been completed to produce a candidate list of four-digit numbers that may signify a focused overload condition, FOD processor 32 begins at step 70 a secondary sampling routine illustrated in FIG. 2B that determines if any of these candidate numbers from the primary sampling routine actually represent ten digit numbers exhibiting the potential for focused overload. Secondary sampling routine utilizes the same match criteria and sampling time communicated by manager 36 in step 52 as described above. However, an embodiment of system 10 may use a match criteria and sampling time for the secondary sampling routine that is separately communicated or specifically designated for use in the secondary sampling routine. In step 72, FOD processor 32 reads a ten-digit dialed number communicated via a query from one of originating switching points 16 to transfer point 18.

Referring now to FIG. 2B, a second portion of flowchart 50 is shown illustrating further exemplary steps associated with the detection of focused overload. Following step 72, FOD processor 32 compares the last four-digits of the dialed number to each of the four-digit candidate numbers stored during step 64 of the primary sampling period. As shown in step 74, if the last four-digits of a dialed number do not match a candidate number in the candidate list, FOD processor 32 proceeds to step 90 where FOD processor 32 determines if the sampling time is exceeded as described below. If the last four-digits of the dialed number do match a candidate number in step 74, FOD processor 32 determines in step 76 if the ten-digit dialed number that has been previously stored in a candidate match list contains all ten-digit numbers whose last four-digits have been previously determined to match a candidate number.

If the ten-digit number has been previously stored in the candidate match list, FOD processor 32 increments a counter associated with that ten-digit dialed number in step 78. If the ten-digit dialed number has not been previously stored, FOD processor 32 first stores the ten-digit number on the candidate match list in step 80 and then creates a counter associated with that stored ten-digit number in step 82. FOD processor 32 then sets the associated counter to an initial value of one in step 84.

Regardless of whether step 78 or steps 80, 82, and 84 are conducted, FOD processor 32 then begins a separate determination in step 86 of whether any of the ten-digit numbers on the candidate match list have met the match criteria. More specifically, FOD processor 32 determines if the counter associated with the ten-digit number stored on the candidate match list in step 80 has met the value specified by the match criteria. If the match criteria are not met for the candidate match number in step 86, FOD processor 32 proceeds directly to determining if the sampling time is exceeded as described below in step 90. If the match criteria is met for a candidate match number, FOD processor 32 adds the ten-digit candidate match number to a focused overload risk list in step 88. FOD processor 32 then proceeds to determine if the sampling time is exceeded in step 90.

FOD processor 32 determines in step 90 if the sampling time designated for the secondary sampling process is exceeded. If the sampling time is not exceeded, FOD processor 32 returns to step 72 where an additional ten-digit dialed number is read. If, however, sampling time has been exceeded, FOD processor 32 sends the ten-digits numbers stored on the focused overload risk list to manager 36 in step 92. In one embodiment of the present invention FOD processor 32 may proceed to step 92 even if the sampling time has not been exceeded if, for example, a predetermined number of matches have been made in step 86 and a limit of numbers with the potential for focused overload has been reached as specified by the manager 36.

Manager 36 then sends each of the ten-digit numbers on the focused overload risk list to each of processors 30, thereby indicating that the potential for focused overload conditions exists at the destination switching points. Processors 30 in turn relay a call control message, as part of query responses for example, associated with each of these high traffic ten-digit numbers to all originating switching points 16 in step 94. In one embodiment, processors 30 only attaches call control messages for a particular at risk ten digit number to query responses sent in reply to queries directly associated with the at risk ten digit number. For example, processor 30 receives a query associated with number A for processing; number A is currently under potential focused overload conditions; processor 30 attaches call control messages for number A to the query response for that query. Each originating switching point would therefore receive call control messages for a specific number only after sending a query associated with the specific number and receiving the messages in that query's query response.

As previously indicated, the call control messages may contain such information as the identity of a ten-digit number, an interval at which queries associated with the ten-digit number are to be sent to transfer point 18 under call control, and a duration for which such call control of query interval will be maintained. Each originating switching point 16 is then triggered by the call control messages to implement manual or automatic controls in step 96 resulting in the regulation of queries, associated with any of the ten-digit numbers displaying the potential for focused overload sent, are sent to transfer point 18.

After or simultaneous with steps 92–96, FOD processor 32 restarts a next primary sampling routine in step 54. It should be noted that if at any time during the primary or secondary sampling routines manager 36 sends a new match criteria and sampling time, FOD processor 32 will proceed immediately to step 52 where the new match criteria and sampling time will be set.

Although the present invention and its advantages have been described in detail, it should be understood that various changes, substitutions, and alterations can be made therein without departing from the spirit and scope of the present invention as defined by the appended claims.

What is claimed is:

1. An apparatus for detecting focused overload in a telecommunications network comprising:
    a plurality of originating switching points each coupled to a plurality of originating devices;
    a destination switching point coupled to a destination device; and
    a transfer point coupled to the plurality of originating switching points and the destination switching point, each of the plurality of originating devices initiating communication through one of the plurality of originating switching points to the destination device utilizing the transfer point, the transfer point including a plurality of processors each operable to process selected initiated communications from the plurality of originating devices, the transfer point operable to select one of the plurality of processors as a focused overload detection processor, the focused overload detection processor operable to detect focused overload at the destination switching point by detecting a predetermined threshold of initiated communications traffic communicated from the plurality of originating devices to the destination device.

2. The apparatus of claim 1, wherein the originating switching points each have a call controller controlling the rate at which communications traffic is initiated from the plurality of originating devices in response to the focused overload detection processor detecting focused overload.

3. The apparatus of claim 1, wherein the transfer point further comprises a manager that directs the plurality of originating switching points to control the rate at which communications traffic is initiated from the plurality of originating devices to the destination device.

4. The apparatus of claim 1, wherein the focused overload detection processor detects focused overload at the destination switching point by monitoring a representative sample of queries to determine the number of queries that are directed at the destination device.

5. The apparatus of claim 1, wherein the focused overload detection processor detects focused overload at the destination switching point by monitoring a representative sample of queries, the queries each associated with a dialed number.

6. The apparatus of claim 5, wherein the focused overload detection processor determines the number of queries within the representative sample of queries that are directed at the destination device during a certain time interval by:
    identifying a subset of digits of the particular dialed number;
    recording the number of queries received by the transfer point during a first sampling period that are associated with dialed numbers having the subset of digits;
    recording the number of queries received by the transfer point during a second sampling period that are associated with dialed numbers identical to the particular dialed number if the number of queries recorded during the first sampling period meets a first predetermined threshold; and
    determining if the number of queries recorded during the second sampling period meets a second predetermined threshold if the number of queries recorded during the first sampling period meets the first predetermined threshold.

7. An apparatus for detecting focused overload in a telecommunications network comprising:
    a plurality of originating switching points each coupled to a plurality of originating devices;
    a destination switching point coupled to a destination device; and
    a transfer point coupled to the plurality of originating switching points and the destination switching point, each of the plurality of originating devices initiating communication through one of the plurality of originating switching points to the destination device utilizing the transfer point, the transfer point detecting focused overload at the destination switching point by detecting a predetermined threshold of initiated communications traffic communicated from the plurality of originating devices to the destination device;
    wherein the transfer point further comprises a focused overload detection processor that detects focused overload at the destination switching point by monitoring a representative sample of queries, the queries each associated with a dialed number;
    wherein the focused overload detection processor determines the number of queries within the representative sample of queries that are directed at the destination device during a certain time interval by:
      identifying a subset of digits of the particular dialed number;
      recording the number of queries received by the transfer point during a first sampling period that are associated with dialed numbers having the subset of digits;
      recording the number of queries received by the transfer point during a second sampling period that are associated with dialed numbers identical to the particular dialed number if the number of queries recorded during the first sampling period meets a first predetermined threshold; and
      determining if the number of queries recorded during the second sampling period meets a second predetermined threshold if the number of queries recorded during the first sampling period meets the first predetermined threshold, wherein the first sampling period and the second sampling period are of the same duration in time.

8. An apparatus for detecting focused overload in a telecommunications network comprising:
    a plurality of originating switching points each coupled to a plurality of originating devices;
    a destination switching point coupled to a destination device; and a transfer point coupled to the plurality of originating switching points and the destination switching point, the originating devices each operable to initiate communication to the destination device, the transfer point including a plurality of processors each operable to process selected initiated communications from the plurality of originating devices, the transfer point operable to select one of the plurality of processors as a focused overload detection processor, the focused overload detection processor operable to detect focused overload at the destination switching point by sampling communications traffic initiated at the transfer point and determining if a predetermined threshold of communications traffic from the plurality of originating devices to the destination device is exceeded in the sample.

9. The apparatus of claim 8, wherein the originating switching points each have a call controller operable to control the rate at which communications traffic is initiated from the plurality of originating devices in response to the focused overload detection processor detecting focused overload.

10. The apparatus of claim 8, wherein the transfer point further comprises a manager operable to direct the plurality of originating switching points to control the rate at which communications traffic is initiated from the plurality of originating devices to the destination device.

11. The apparatus of claim 8, wherein the focused overload detection processor is operable to detect focused overload at the destination switching point by monitoring a representative sample of queries to determine the number of queries that are directed at the destination device.

12. The apparatus of claim 8, wherein the focused overload detection processor is operable to detect focused overload at the destination switching point by monitoring a representative sample of queries, the queries each associated with a dialed number.

13. The apparatus of claim 12, wherein the focused overload detection processor is operable to determine the number of queries within the representative sample of queries that are directed at the destination device during a certain time interval by:
   identifying a subset of digits of the particular dialed number;
   recording the number of queries received by the transfer point during a first sampling period that are associated with dialed numbers having the subset of digits;
   recording the number of queries received by the transfer point during a second sampling period that are associated with dialed numbers identical to the particular dialed number if the number of queries recorded during the first sampling period meets a first predetermined threshold; and
   determining if the number of queries recorded during the second sampling period meets a second predetermined threshold if the number of queries recorded during the first sampling period meets the first predetermined threshold.

14. An apparatus for detecting focused overload in a telecommunications network comprising:
   a plurality of originating switching points each coupled to a plurality of originating devices;
   a destination switching point coupled to a destination device; and
   a transfer point coupled to the plurality of originating switching points and the destination switching point, the originating devices each operable to initiate communication to the destination device, the transfer point operable to detect focused overload at the destination switching point by sampling communications traffic initiated at the transfer point and determining if a predetermined threshold of communications traffic from the plurality of originating devices to the destination device is exceeded in the sample;

wherein the transfer point further comprises a focused overload detection processor that is operable to detect focused overload at the destination switching point by monitoring a representative sample of queries, the queries each associated with a dialed number;

wherein the focused overload detection processor is operable to determine the number of queries within the representative sample of queries that are directed at the destination device during a certain time interval by:
   identifying a subset of digits of the particular dialed number;
   recording the number of queries received by the transfer point during a first sampling period that are associated with dialed numbers having the subset of digits;
   recording the number of queries received by the transfer point during a second sampling period that are associated with dialed numbers identical to the particular dialed number if the number of queries recorded during the first sampling period meets a first predetermined threshold; and
   determining if the number of queries recorded during the second sampling period meets a second predetermined threshold if the number of queries recorded during the first sampling period meets the first predetermined threshold, wherein the first sampling period and the second sampling period are of the same duration in time.

15. A method of detecting focused overload at a switching point in a telecommunications network comprising:
   receiving queries at a plurality of processors;
   selecting one of the plurality of processors as a focused overload detection processor;
   monitoring queries received by the focused overload detection processor, the queries each associated with a dialed number; and
   determining if a current rate at which queries associated with a particular dialed number are received by the focused overload detection processor creates the potential for focused overload at the switching point by:
      identifying a subset of digits of the particular dialed number;
      recording the number of queries received by the transfer point during a first sampling period that are associated with dialed numbers having the subset of digits;
      recording the number of queries received by the transfer point during a second sampling period that are associated with dialed numbers identical to the particular dialed number if the number of queries recorded during the first sampling period meets a first predetermined threshold; and
      determining if the number of queries recorded during the second sampling period meets a second predetermined threshold if the number of queries recorded during the first sampling period meets the first predetermined threshold.

16. The method of claim 15, further comprising:
controlling a future rate at which queries associated with a particular dialed number are sent to the focused overload detection processor in response to determining if the current rate creates the potential for focused overload at the switching point.

17. The method of claim 16, wherein controlling the future rate comprises controlling the future rate for a predetermined period of time.

18. The method of claim 15, wherein identifying a subset of digits further comprises identifying the last four digits of the dialed number.

19. The method of claim 18, wherein recording the number of queries received by the focused overload detection processor during a first sampling period further comprises recording the number of queries received by the focused overload detection processor having the same last four digits as the dialed number.

20. The method of claim 15, wherein determining if the rate at which queries associated with a particular dialed number are received further comprises determining the rate at which queries associated with a particular ten digit dialed number are received.

21. The method of claim 15, wherein the first sampling period and the second sampling period are of the same duration in time.

* * * * *